United States Patent [19]
Frary et al.

[11] Patent Number: 5,949,342
[45] Date of Patent: Sep. 7, 1999

[54] SHOCK SENSING AND REPORTING DEVICE

[75] Inventors: James Martin Frary, Louisville; David T. Hoge, Westminster, both of Colo.

[73] Assignee: Storage Technology Corporation, Louisville, Colo.

[21] Appl. No.: 09/001,790

[22] Filed: Dec. 31, 1997

[51] Int. Cl.[6] .................................................. G08B 13/22
[52] U.S. Cl. .................. 340/665; 340/686; 340/825.31; 360/60; 360/69; 360/75
[58] Field of Search ................................... 340/665, 540, 340/584, 686, 825.31; 360/60, 75, 69, 133; 307/119, 45, 65; 369/44.11, 44.21, 291; 206/307, 308, 309, 310

[56] References Cited

U.S. PATENT DOCUMENTS

| | | | |
|---|---|---|---|
| 4,862,298 | 8/1989 | Genheimer et al. | 360/60 |
| 4,970,710 | 11/1990 | Lee | 369/44.11 |
| 5,321,395 | 6/1994 | Van Santbrink | 340/825.31 |
| 5,434,464 | 7/1995 | Bobbio et al. . | |
| 5,536,988 | 7/1996 | Zhang et al. . | |
| 5,721,457 | 2/1998 | Sri-Jayantha et al. | 307/119 |
| 5,757,580 | 5/1998 | Andress et al. | 360/97.02 |
| 5,777,815 | 7/1998 | Kasiraj et al. | 360/75 |

Primary Examiner—Edward Lefkowitz
Assistant Examiner—Davetta Woods
Attorney, Agent, or Firm—Brooks & Kushman P.C.

[57] ABSTRACT

A device senses a mechanical shock to a component, such as a tape cartridge, and provides indication thereof to a reader mechanism upon inquiry by the reader mechanism. The device, secured to the component, includes a sensing structure which reacts to a shock event. The device also includes a transmission for transmitting the occurrence of a shock event prior to use of the component upon appropriate inquiry by the reader mechanism.

18 Claims, 7 Drawing Sheets

Fig. 16

SHOCK SENSING AND REPORTING DEVICE

TECHNICAL FIELD

This invention relates to shock sensing and reporting devices for sensitive components, such as removable data storage media.

BACKGROUND ART

Some components are sensitive to mechanical shock events that may cause damage to the component itself or to the data associated with the component. For example, large capacity data cartridges rely on thinner tape and finer track pitch to achieve high storage density. These characteristics require that the mechanical mechanisms in the cartridge and the tape path within the drives meet extremely high tolerances. Some of these new cartridges are very susceptible to mechanical damage which can occur when the cartridge is subjected to high impact, such as falling from a table to the floor. Damage can occur if the impact causes mechanical misalignment of components within the cartridge. When a tape that has suffered a damaging impact is loaded into a drive, the drive/tape motion can cause loss of data or total tape destruction due to these mechanical misalignments.

Thus, there exists a need for a device that monitors components, such as removable data storage media, for such damaging events and reports the potentially damaging event in response to an appropriate inquiry.

DISCLOSURE OF THE INVENTION

It is a general object of the present invention to provide a device for sensing a mechanical shock to a component and providing indication thereof upon inquiry.

It is also an object of the present invention to provide such a device for sensing a mechanical shock to a removable data storage media and providing indication thereof prior to loading the data storage media into a corresponding drive mechanism.

In carrying out the above object and other objects, features, and advantages of the present invention, a device is provided for sensing a mechanical shock to a component and providing indication thereof to a reader mechanism. The device comprises a sensing structure secured to the removable data storage media, which reacts in response to an occurrence of a shock event. The device also includes means for transmitting the occurrence of the shock event upon inquiry by the reader mechanism prior to use of the component.

The above objects and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
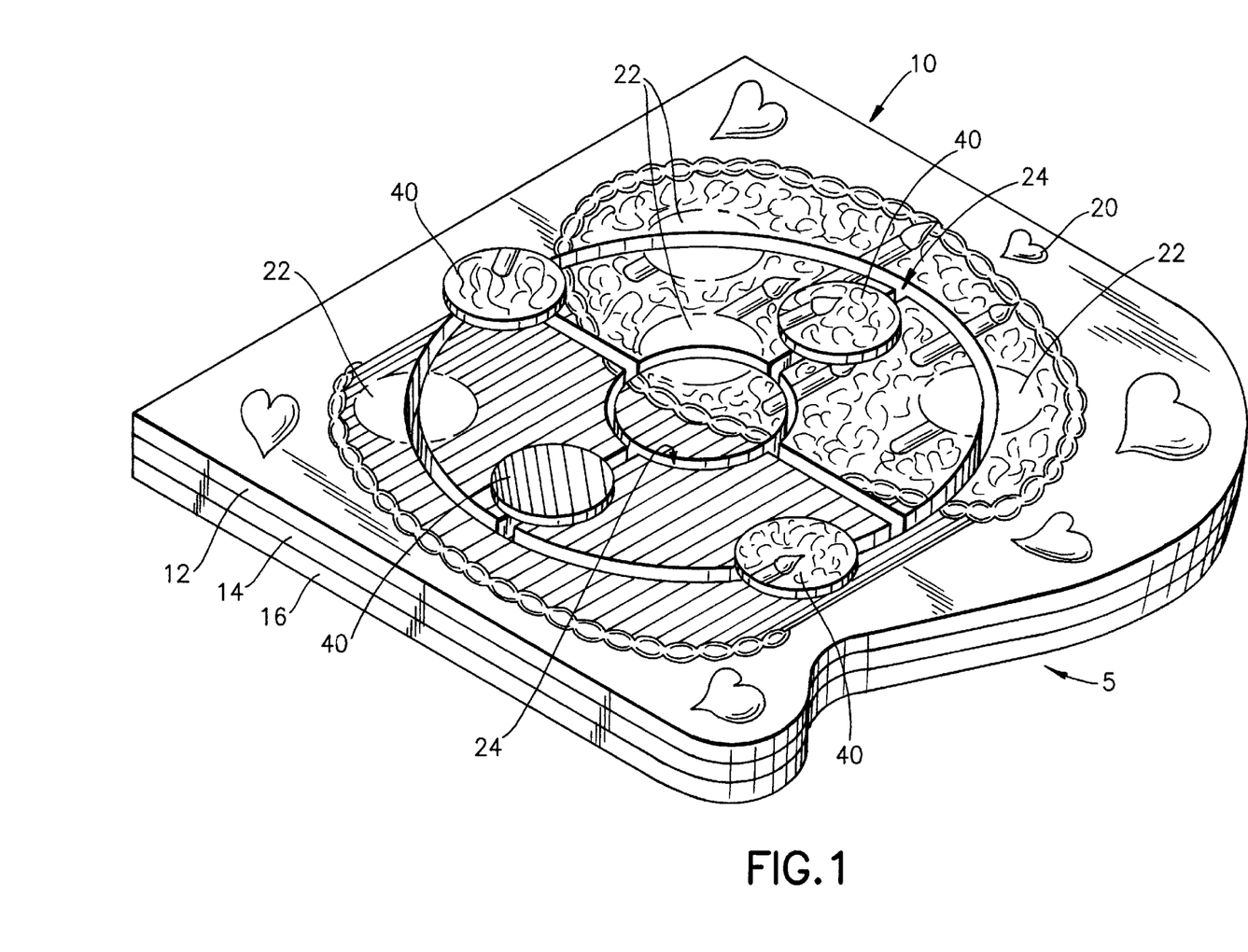
FIG. 1 is a diagram illustrating the environment in which the present invention is utilized.

Turning now to FIG. 1, there is shown a diagram of an exemplary environment in which the present invention is utilized. In this environment, the component is a removable data storage media, such as a tape cartridge 10, which houses a tape (not shown) containing data. A microelectromechanical (MEM) device 12 constructed in accordance with the teachings of the present invention is attached directly to the tape cartridge 10.

MEM device 12 senses a mechanical shock event to the tape cartridge and provides indication thereof upon an appropriate inquiry. In order to accomplish this, MEM device 12 includes a sensing device having a physical parameter associated therewith which changes in response to a shock event, and means for transmitting the change to a reader mechanism 18. The electrical parameter may be an electrically conductive path in which a portion of the path is susceptible to either breakage or displacement upon experiencing a shock event. The occurrence of the shock event can be transmitted to the reader mechanism 18 in one of several ways, such as via electrical contact with the reader mechanism 18 or by the reader mechanism 18 sensing a field disturbance or a data stream. Exemplary configurations of the MEM device 12 will be described to further illustrate the operation of the present invention.

Figures 1, 2:
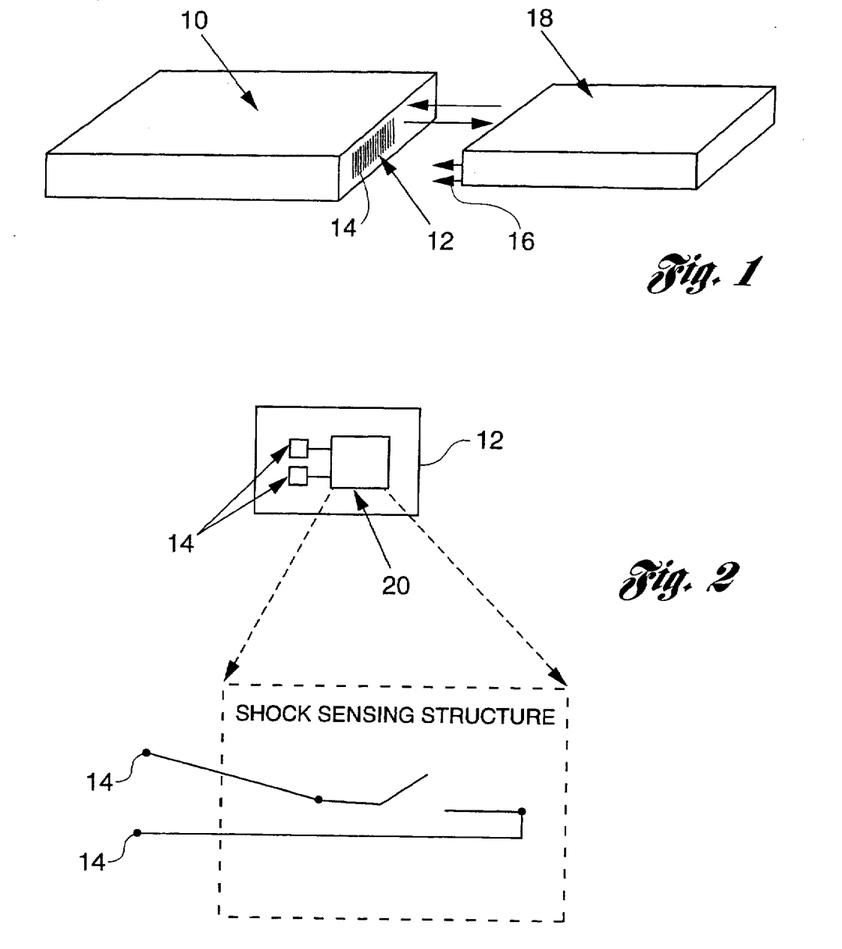
FIG. 2 is a schematic diagram of a first embodiment of the device of the present invention.

FIG. 2 is a schematic diagram of a simple MEM device 12. In this embodiment, MEM device 12 comprises a simple, non-resettable pass/fail sensing structure 20 having an electrically conductive path in which a portion of the path is susceptible to breakage, forming a discontinuity, in response to a shock event. Contact pads 14 of the sensing structure 20 allow for sensing the discontinuity via an open circuit if the sensing structure 20 is normally closed, or via a short circuit if the sensing structure is normally open.

In this embodiment, electrical contact pads 14 are positioned so as to make contact with corresponding probe tips 16 of the reader mechanism 18. Upon making contact between the MEM device 12 and the probe tips 16, the reader mechanism 18 can determine whether or not the tape cartridge 10 experienced any damage prior to actually inserting the tape cartridge 10 into a tape drive (not shown).

Figure 3:
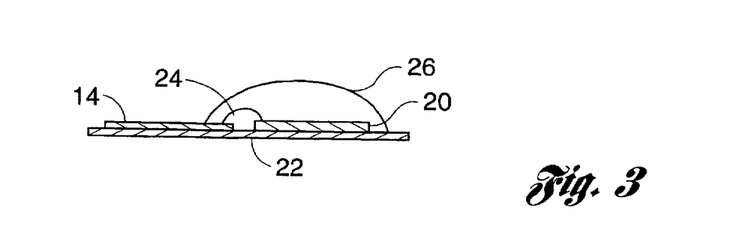
FIG. 3 is a cross-sectional view of the device shown in FIGS. 1 and 2.

FIG. 3 is a cross-sectional view of the MEM device 12 shown in FIG. 2. The device 12 includes a non-conductive substrate layer 22. Disposed on the substrate layer 22 are the contact pads 14 and the sensing structure 20, which are electrically connected via a hardwire interconnect 24. The interconnect 24 and the sensing structure 20 are preferably protected via an encapsulation 26.

Figure 4:
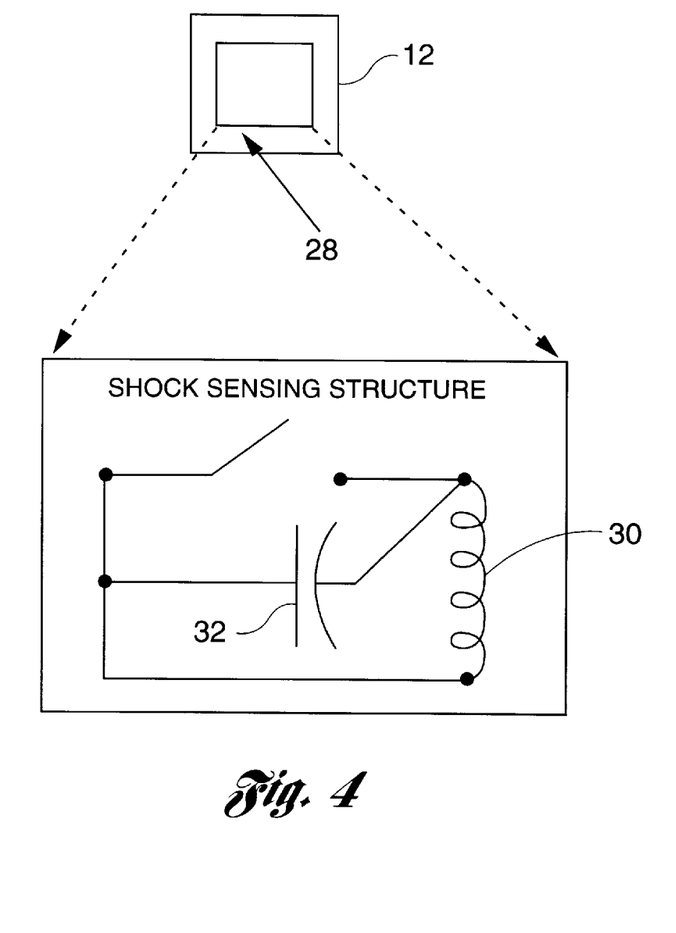
FIG. 4 is a schematic diagram of a second embodiment of the device of the present invention.
Figure 5:
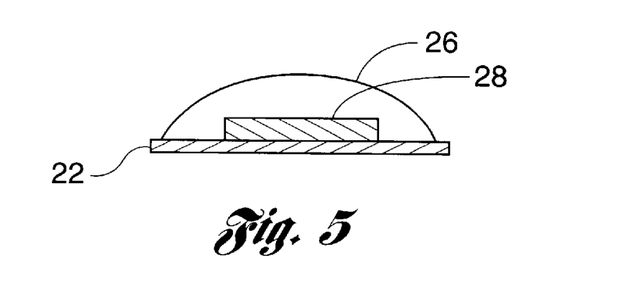
FIG. 5 is a cross-sectional view of the device shown in FIG. 4.

A second embodiment of the present invention is illustrated in FIGS. 4 and 5. In this embodiment, the MEM device 12 comprises an inductor-based sensing device 28. The sensing device 28 includes an inductor 30 and a capacitor 32 having a characteristic impedance. Upon experiencing a shock event, a displacement occurs in the path and the impedance changes.

A cross-sectional view of the device 12 shown in FIG. 4 is illustrated in FIG. 5. The sensing device 28 is disposed on the substrate 22 and protected by encapsulation 26.

Figure 6:
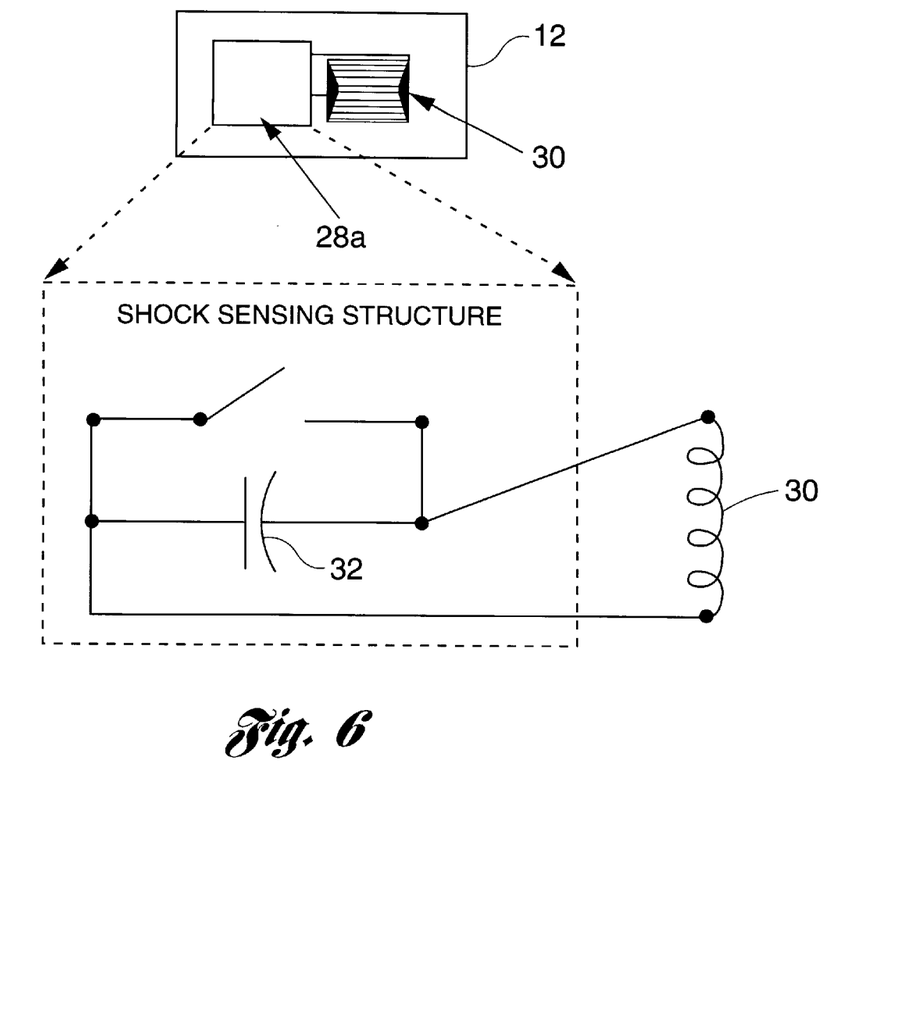
FIG. 6 is a schematic diagram of a third embodiment of the device of the present invention.
Figure 7:
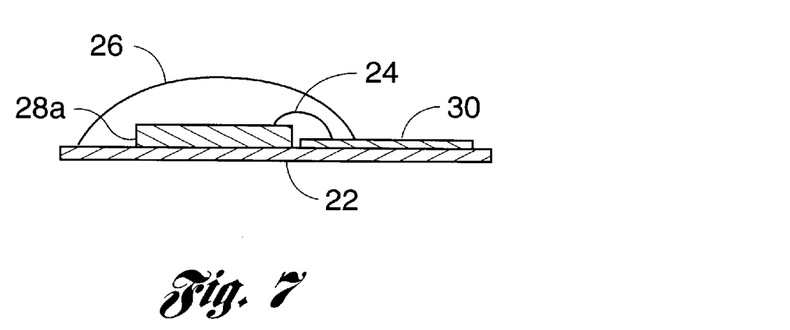
FIG. 7 is a cross-sectional view of the device shown in FIG. 6.

The device 12 shown in FIG. 6 is similar to that shown in FIG. 4, however, the inductor 30 is separate from the sensing device 28a. A cross-sectional view of this device is shown in FIG. 7.

For each of the embodiments shown in FIGS. 4–9, the MEM device 12 may include contact pads 14 coupled to the electrical circuit for mating with corresponding probe tips 16 disposed on reader mechanism 18. Alternatively, the occurrence of a shock event can be transmitted to the reader mechanism 18 via a field disturbance. That is, the electrical circuit inherently has a resonant frequency associated therewith. Upon transmission of a signal at the resonant frequency by the reader mechanism 18, if a shock event has occurred, MEM device 12 will radiate a signal back at a different frequency.

Figure 8:
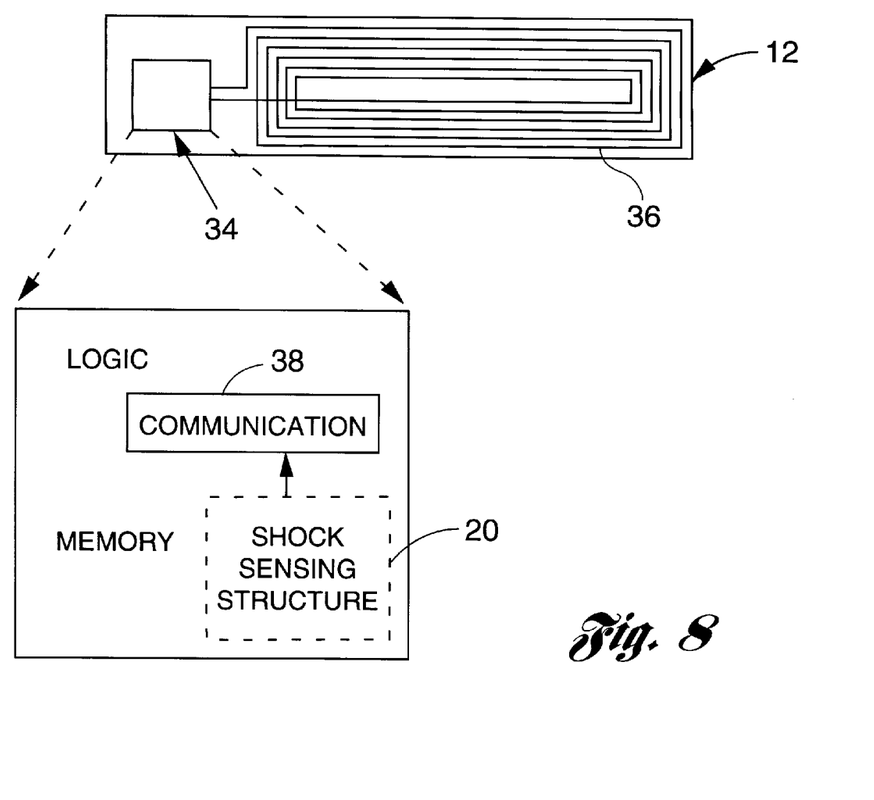
FIG. 8 is a schematic diagram of a fourth embodiment of the device of the present invention.
Figure 9:
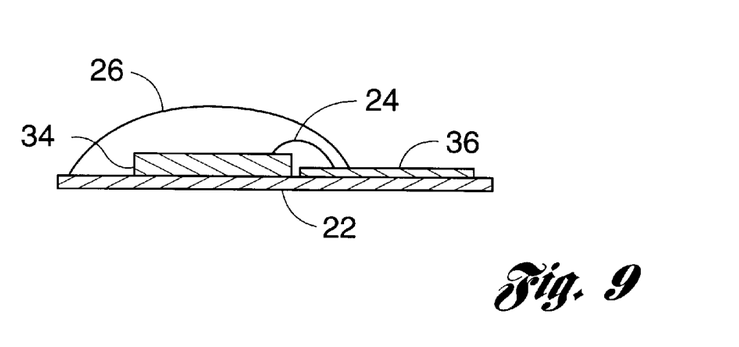
FIG. 9 is a cross-sectional view of the device shown in FIG. 8.

Turning now to FIGS. 8 and 9, there is shown yet another embodiment of the present invention. In this embodiment, the device 12 includes an integrated circuit (IC) 34 having control circuitry and a shock sensing device such as the simple non-resettable pass/fail sensing structure 20 shown in FIG. 2 as well as an antenna 36 operating at a predetermined frequency. Such a device may be used with a multifunctional EMT device such as the one disclosed in U.S. application entitled "Multifunctional Electromagnetic Transponder Device and Method For Performing Same", having Ser. No. 08/998,850, filed Dec. 29, 1997, and having the same assignee as the present invention, which automatically transfers data to the reader mechanism 18 upon being signalled by the reader mechanism 18.

The IC 34 presents a binary input to the communication circuitry 38 upon the sensing structure 20 sensing a shock event. Either a "1" or "0" represents a failed condition, wherein the sensing structure 20 had been "activated" by the tape cartridge 10 experiencing a mechanical shock event which potentially damages the data, the tape cartridge 10 or transport mechanisms within the tape cartridge 10. In this case, upon power up of the EMT device via antenna 36 receiving a signal from the reader mechanism 18, the data indicating activation of the sensing structure 20 is transmitted to the reader mechanism 18. The entity or user receiving the data from the reader mechanism 18 can then respond in a prescribed manner to insure that action is taken to recover the data on the damaged tape cartridge 10.

A cross-sectional view of the device 12 shown in FIG. 8 is illustrated in FIG. 9. As with the other embodiments, the IC 34 is disposed on the substrate 22 and connected to the antenna 36 via hardwire interconnect 24. The IC 34 and the hardwire interconnect 24 are covered by encapsulation 26.

Each of the MEM devices shown in FIGS. 2–9 are secured to the component, or tape cartridge, in any manner which ensures that the mechanical shock is transferred to the sensing device without being absorbed or damped by the mechanism of attachment. This may be accomplished by gluing the device 12 to the tape cartridge.

Figure 10:
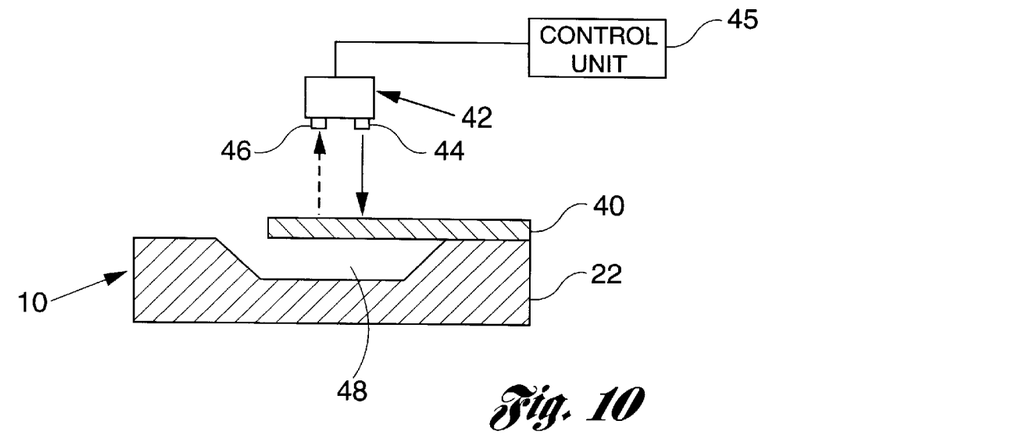
FIG. 10 is a cross-sectional view of a fifth embodiment of the device of the present invention.
Figure 11:
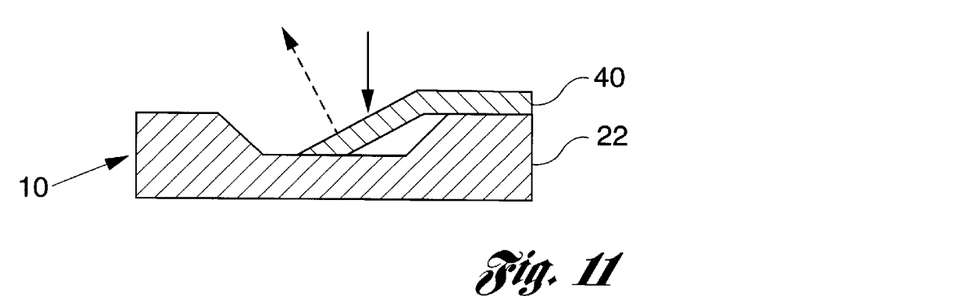
FIG. 11 is a cross-sectional view of the device shown in FIG. 10 in the broken state.

Still further, an alternative embodiment of a shock sensing and reporting device 10 is shown in FIGS. 10–14. In this embodiment, the device 10 includes a sensing structure consisting of a reflective surface 40, such as a mirror or micro-mirror, that reflects a light, laser or other incoming optical probe from an optical transceiver 42. Optical transceiver 42 includes a transmitter 44 for transmitting the optical probe as directed by a control unit 45 and a receiver 46 for receiving the optical probe. The reflective surface 40 may be a cantilever structure suspended over a cavity 48 in the substrate 22, as shown in FIG. 10. In the unbroken state, light incident perpendicular to the structure is reflected back at the same angle. In the broken state, FIG. 11, the light is reflected off-axis of the incoming light.

Figure 12:
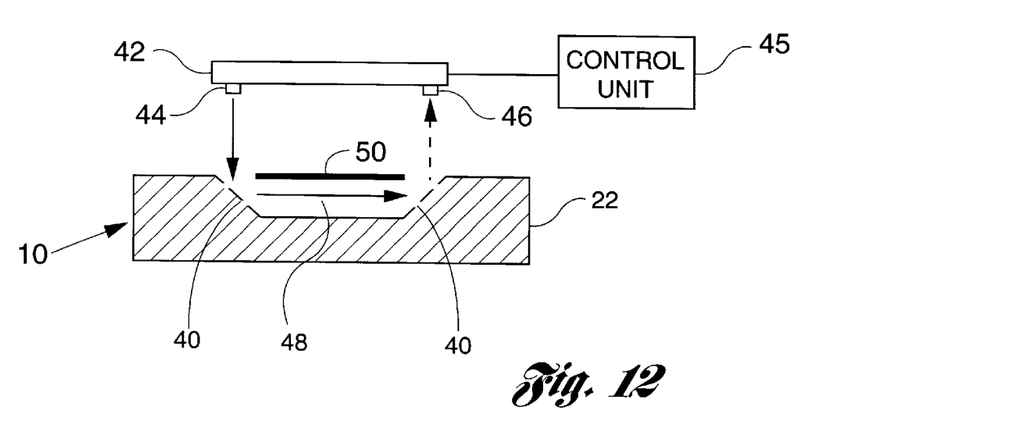
FIG. 12 is a cross-sectional view of a sixth embodiment of the device of the present invention.
Figure 13:
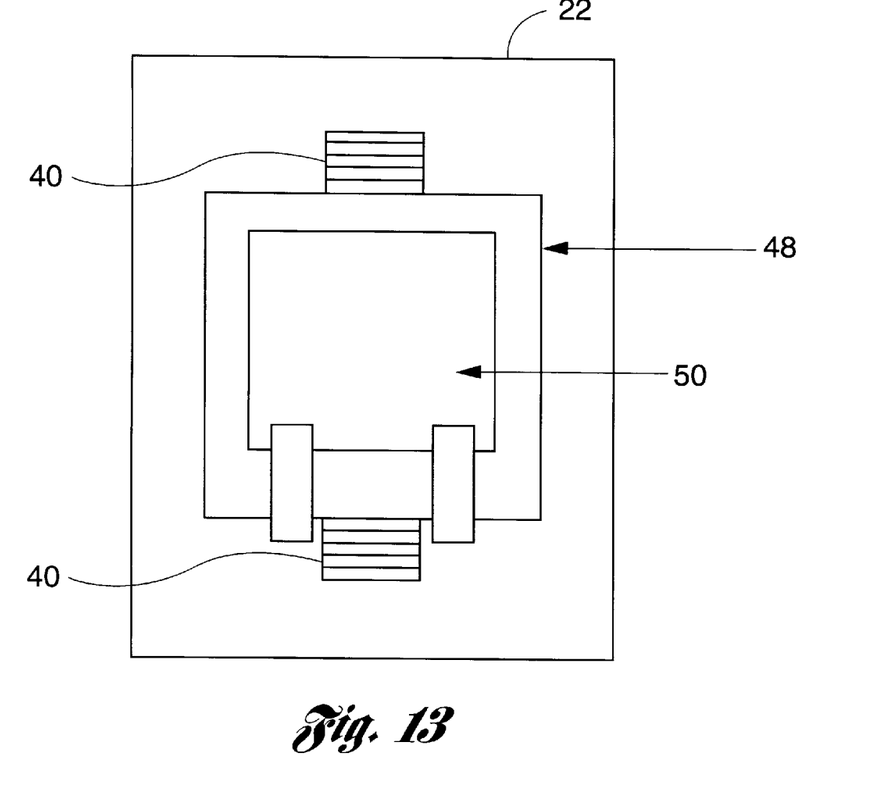
FIG. 13 is a top view of the device shown in FIG. 12.
Figure 14:
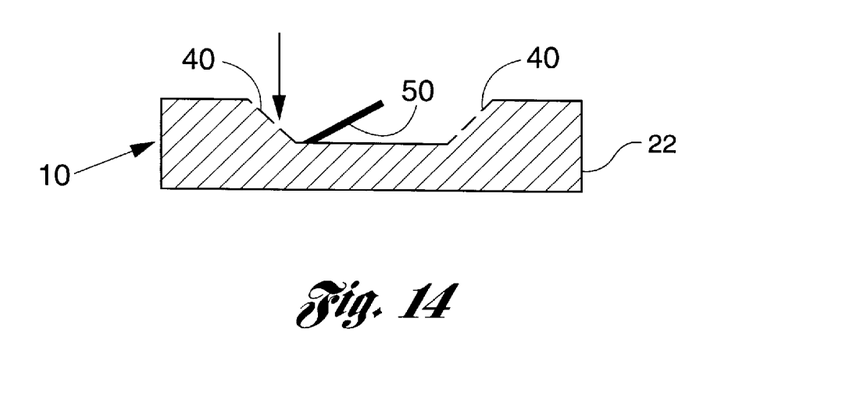
FIG. 14 is a cross-sectional view of the device shown in FIG. 12 in the broken state.

In an alternative embodiment, the reflective surface 40 consists of two separate angled surfaces (e.g., 45°) formed in the cavity 48 of the substrate 22 and opposed from each other at opposite angles, as shown in FIG. 12. A top view of this embodiment is shown in FIG. 13 to illustrate a non-reflective membrane 50 suspended over the cavity 48. In this case, light enters the cavity 48 and reflects from the reflective surfaces 40 and back out again. In the broken state, shown in FIG. 14, the non-reflective membrane 50 collapses into the cavity 48 and blocks the path so no light is reflected.

Figure 15:
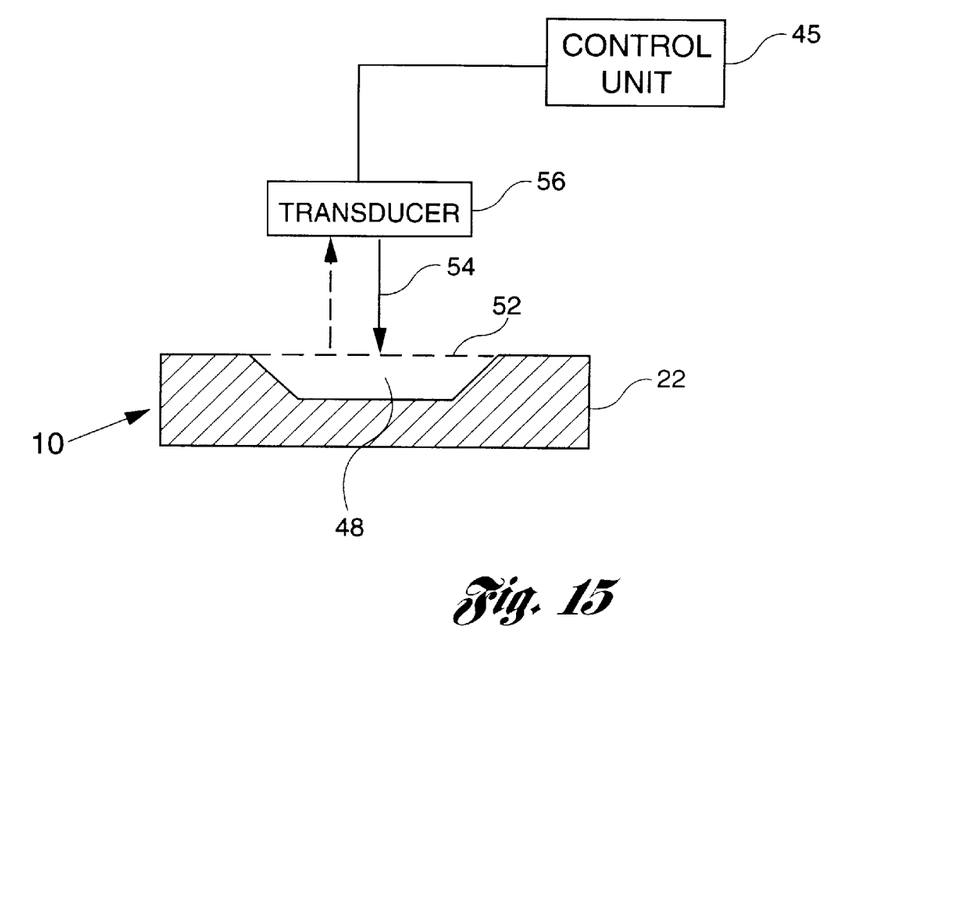
FIG. 15 is a cross-sectional view of a seventh embodiment of the device of the present invention.
Figure 16:
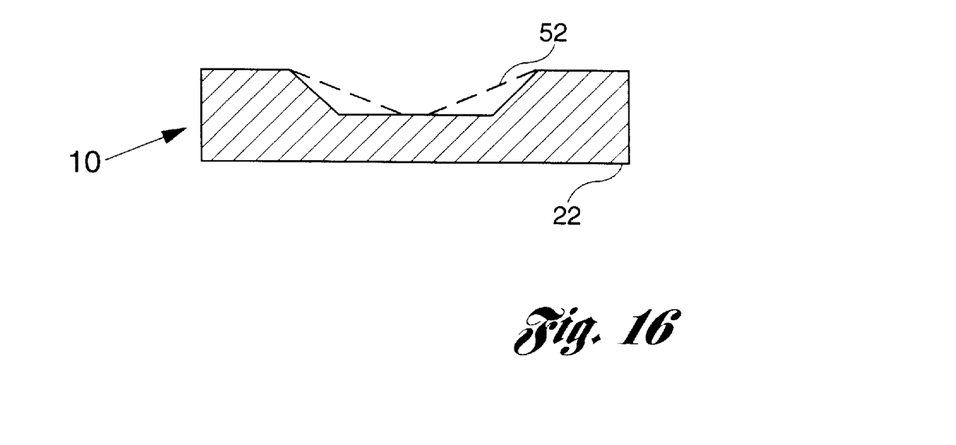
FIG. 16 is a cross-sectional view of the device shown in FIG. 15 in the broken state.

Turning now to FIGS. 15 and 16, another embodiment is shown which utilizes a thin membrane that can be stimulated by an ultrasonic signal. In this embodiment, a thin membrane 52 is suspended over the cavity 48. The thickness of the membrane 52 and other material properties determine a frequency at which the membrane 52 will vibrate when subjected to an incident soundwave 54. When the membrane 52 is intact, ultrasonic energy is absorbed and can be detected by a transducer 56. When the membrane 52 is broken, as shown in FIG. 16, no vibration occurs and thus no absorption can be detected.

While the best modes for carrying out the invention have been described in detail, those familiar with the art to which this invention relates will recognize various alternative designs and embodiments for practicing the invention as defined by the following claims.

What is claimed is:

1. A device for sensing a mechanical shock to a removable data storage media when not in use and providing indication thereof to a self-contained reader mechanism operative to transmit a signal for receipt by the removable data storage media, the device comprising:

a sensing structure secured to the removable data storage media, wherein the sensing structure reacts in response to an occurrence of a shock event; and means for transmitting the occurrence of the shock event upon receipt of the signal transmitted by the reader mechanism prior to use of the removable data storage media.

2. The device as recited in claim 1 wherein the sensing structure is an electrical circuit having a physical parameter associated therewith.

3. The device as recited in claim 2 wherein the electrical parameter includes an electrically conductive path in which a portion of the path is susceptible to one of breakage and displacement in response to the shock event.

4. The device as recited in claim 3 wherein the electrically conductive path is normally open and wherein the change is a short circuit due to the breakage.

5. The device as recited in claim 3 wherein the electrically conductive path is normally closed and wherein the change is an open circuit due to the breakage.

6. The device as recited in claim 3 wherein the electrically conductive path has a characteristic impedance associated therewith and wherein the change is a change in the impedance due to the displacement.

7. The device as recited in claim 3 wherein the reader mechanism includes conductive probe tips and wherein the means for transmitting includes electrical contact pads connected to the electrically conductive path and positioned so as to make contact with the probe tips.

8. The device as recited in claim 3 wherein the electrical circuit includes a resonance circuit having a predetermined resonant frequency.

9. The device as recited in claim 8 wherein the reader mechanism queries the device by transmitting a signal at the predetermined resonant frequency and wherein the means for transmitting includes the electrical circuit retransmitting the signal at a second frequency.

10. The device as recited in claim 1 further comprising:

control logic coupled to the sensing structure for storing data in response to the change in the electrical parameter; and wherein the means for transmitting includes an antenna coupled to the control logic operating at a predetermined frequency, the antenna for transmitting the data stream to the reader mechanism at the predetermined frequency in response to an inquiry signal transmitted by the reader mechanism at the predetermined frequency.

11. The device as recited in claim 1 wherein the sensing structure and the means for transmitting are disposed on a non-conductive substrate.

12. The device as recited in claim 11 wherein the sensing structure and the means for transmitting are encapsulated.

13. The device as recited in claim 11 wherein the sensing structure and the means for transmitting are connected via a hardwire interconnect.

14. The device as recited in claim 13 wherein the sensing structure and the hardwire interconnect are encapsulated.

15. The device as recited in claim 1 wherein the sensing structure includes a reflective member for receiving an optical transmission transmitted at a predetermined angle from the reader mechanism and wherein the means for transmitting includes the reflective member for transmitting a reflected signal in response to the optical transmission.

16. The device as recited in claim 15 wherein the sensing structure includes a substrate having a cavity formed therein and wherein the reflective surface is a cantilever reflective surface secured to the substrate and having a portion suspended over the cavity, wherein in response to the shock event the reflective surface collapses and thereby transmits the reflected signal at a second angle different from the predetermined angle.

17. The device as recited in claim 15 wherein the sensing structure includes a substrate having a cavity formed therein, the cavity having two opposing reflecting surface walls, the first reflecting surface wall angled at a first angle and the second reflecting surface wall angled at an opposite second angle, the sensing structure further including a non-reflective membrane suspended over the cavity so that when the optical transmission is received at the first reflecting surface wall, the optical transmission is reflected to the second reflecting surface wall for reflection therefrom, and wherein in response to the shock event, the non-reflective membrane collapses into the cavity so that the optical transmission is not reflected to the second reflecting surface wall.

18. The device as recited in claim 1 wherein the sensing structure includes a substrate having a cavity formed therein and a membrane secured to and suspended over the substrate, the membrane vibrating at a predetermined frequency in response to a soundwave transmitted by the reader mechanism, and wherein the means for transmitting the occurrence of the shock event includes the membrane failing to vibrate in response to the soundwave due to the membrane being broken.

* * * * *

UNITED STATES PATENT AND TRADEMARK OFFICE
CERTIFICATE OF CORRECTION

PATENT NO. : 5,949,342

DATED : September 7, 1999

INVENTOR(S) : James Martin Frary et al.

It is certified that error appears in the above-identified patent and that said Letters Patent is hereby corrected as shown below:

Delete drawing sheet 1 of 7, and substitute therefore the sheet consisting of Figs. 1, 2 and 3, as shown on the attached page.

Signed and Sealed this

Ninth Day of May, 2000

*Attest:*

Q. TODD DICKINSON

*Attesting Officer*  *Director of Patents and Trademarks*